United States Patent
Sakata

(10) Patent No.: US 7,065,442 B2
(45) Date of Patent: Jun. 20, 2006

(54) AUTOMATIC SLOWDOWN CONTROL APPARATUS FOR A VEHICLE

(75) Inventor: Kunio Sakata, Tokyo (JP)

(73) Assignee: Mitsubishi Fuso Truck and Bus Corporation, Tokyo (JP)

( * ) Notice: Subject to any disclaimer, the term of this patent is extended or adjusted under 35 U.S.C. 154(b) by 0 days.

(21) Appl. No.: 11/084,239

(22) Filed: Mar. 21, 2005

(65) Prior Publication Data

US 2005/0216164 A1    Sep. 29, 2005

(30) Foreign Application Priority Data

Mar. 25, 2004    (JP)    ............................... 2004-90286

(51) Int. Cl.
G06F 19/00    (2006.01)
F02D 29/02    (2006.01)
B60T 8/00    (2006.01)

(52) U.S. Cl. .......................... 701/72; 701/70; 701/80; 701/79; 701/75; 701/94

(58) Field of Classification Search ............ 701/70–72, 701/75, 79–80, 41–44, 77; G06F 15/00
See application file for complete search history.

(56) References Cited

U.S. PATENT DOCUMENTS

| | | | |
|---|---|---|---|
| 4,669,745 A * | 6/1987 | Miki et al. | 180/410 |
| 4,720,790 A * | 1/1988 | Miki et al. | 701/41 |
| 4,774,667 A * | 9/1988 | Kuraoka et al. | 701/78 |
| 4,998,593 A * | 3/1991 | Karnopp et al. | 180/408 |
| 5,089,967 A * | 2/1992 | Haseda et al. | 701/78 |
| 5,150,298 A * | 9/1992 | Fujioka et al. | 701/79 |
| 5,225,765 A * | 7/1993 | Callahan et al. | 323/235 |
| 5,408,411 A * | 4/1995 | Nakamura et al. | 701/48 |
| 5,418,727 A * | 5/1995 | Ikeda et al. | 701/96 |
| 5,502,639 A * | 3/1996 | Fukunaga et al. | 701/41 |
| 5,589,815 A * | 12/1996 | Nishihara et al. | 340/444 |
| 5,627,754 A * | 5/1997 | Asanuma et al. | 701/41 |
| 5,636,121 A * | 6/1997 | Tsuyama et al. | 701/70 |
| 5,700,073 A * | 12/1997 | Hiwatashi et al. | 303/146 |
| 5,707,120 A * | 1/1998 | Monzaki et al. | 303/146 |
| 5,729,107 A * | 3/1998 | Shimizu et al. | 318/489 |
| 5,733,019 A * | 3/1998 | Inagaki et al. | 303/146 |
| 5,782,543 A * | 7/1998 | Monzaki et al. | 303/146 |
| 5,799,261 A * | 8/1998 | Ozaki et al. | 701/78 |
| 5,799,745 A * | 9/1998 | Fukatani | 180/410 |
| 5,839,798 A * | 11/1998 | Monzaki et al. | 303/146 |
| 5,862,503 A * | 1/1999 | Eckert et al. | 701/78 |
| 5,947,221 A * | 9/1999 | Taniguchi et al. | 180/197 |
| 6,026,343 A * | 2/2000 | Ogino | 701/72 |
| 6,053,583 A * | 4/2000 | Izumi et al. | 303/150 |
| 6,059,688 A * | 5/2000 | Nozaki et al. | 477/97 |

(Continued)

FOREIGN PATENT DOCUMENTS

JP    2572856    5/1991

(Continued)

*Primary Examiner*—Cuong Nguyen
(74) *Attorney, Agent, or Firm*—Jacobson Holman PLLC

(57) ABSTRACT

An automatic slowdown control apparatus for a vehicle is disclosed wherein automatic slowdown control can be ended appropriately and automatic slowdown is prevented from being performed excessively on a road of an ascending gradient. The automatic slowdown control apparatus starts automatic slowdown control of rendering a braking mechanism operative to slow down the vehicle when the stability of the posture and/or behavior of the vehicle upon turning is deteriorated. A control end threshold value is set such that the stability of the vehicle is displaced to the instability side as the ascending gradient of the uphill road increases.

11 Claims, 11 Drawing Sheets

U.S. PATENT DOCUMENTS

| | | | |
|---|---|---|---|
| 6,064,931 A * | 5/2000 | Sawada et al. | 701/41 |
| 6,074,020 A * | 6/2000 | Takahashi et al. | 303/146 |
| 6,081,761 A * | 6/2000 | Harada et al. | 701/72 |
| 6,092,882 A * | 7/2000 | Matsuno | 303/146 |
| 6,155,655 A * | 12/2000 | Matsuno | 303/140 |
| 6,158,826 A * | 12/2000 | Yasuda | 303/191 |
| 6,208,929 B1 * | 3/2001 | Matsuno et al. | 701/89 |
| 6,219,609 B1 * | 4/2001 | Matsuno et al. | 701/72 |
| 6,236,926 B1 * | 5/2001 | Naitou | 701/70 |
| 6,272,418 B1 * | 8/2001 | Shinmura et al. | 701/72 |
| 6,289,281 B1 * | 9/2001 | Shinmura et al. | 701/301 |
| 6,339,739 B1 * | 1/2002 | Folke et al. | 701/70 |
| 6,360,150 B1 * | 3/2002 | Fukushima et al. | 701/41 |
| 6,377,885 B1 * | 4/2002 | Yasui et al. | 701/80 |
| 6,409,287 B1 * | 6/2002 | Leach et al. | 303/146 |
| 6,435,626 B1 * | 8/2002 | Kostadina | 303/139 |
| 6,449,542 B1 * | 9/2002 | Bottiger et al. | 701/41 |
| 6,463,378 B1 * | 10/2002 | Nishio | 701/70 |
| 6,588,858 B1 * | 7/2003 | Ritz et al. | 303/140 |
| 6,598,946 B1 * | 7/2003 | Nagae | 303/190 |
| 6,618,660 B1 * | 9/2003 | Walenty et al. | 701/71 |
| 6,654,674 B1 * | 11/2003 | Lu et al. | 701/36 |
| 6,691,017 B1 * | 2/2004 | Banno et al. | 701/84 |
| 6,697,728 B1 * | 2/2004 | Kin et al. | 701/70 |
| 6,895,317 B1 * | 5/2005 | Yasui et al. | 701/36 |
| 6,941,212 B1 * | 9/2005 | Sakata | 701/72 |
| 2002/0013652 A1 * | 1/2002 | Yasui et al. | 701/80 |
| 2003/0074125 A1 * | 4/2003 | Walenty et al. | 701/71 |
| 2003/0218378 A1 * | 11/2003 | Tanaka et al. | 303/146 |
| 2004/0019417 A1 * | 1/2004 | Yasui et al. | 701/36 |
| 2004/0099469 A1 * | 5/2004 | Koibuchi et al. | 180/421 |
| 2004/0133324 A1 * | 7/2004 | Yasui et al. | 701/41 |
| 2005/0102085 A1 * | 5/2005 | Sakata | 701/72 |

FOREIGN PATENT DOCUMENTS

| | | |
|---|---|---|
| JP | 11208438 | 8/1999 |
| JP | 2000062499 | 2/2000 |
| JP | 2001206107 | 7/2001 |

* cited by examiner

STEADY GAIN        NOISE REMOVAL

UPON UNDERSTEER

UPON OVERSTEER

UPON UNDERSTEER

UPON OVERSTEER

VEHICLE POSTURE CONTROL

YAW MOMENT TO BE GENERATED ON VEHICLE BODY

DECELERATION TO BE GENERATED ON VEHICLE BODY

AUTOMATIC SLOWDOWN CONTROL APPARATUS FOR A VEHICLE

BACKGROUND OF THE INVENTION

1. Field of the Invention

This invention relates to a control apparatus for automatically slowing down a vehicle in order to suppress unstable movement of the posture of the vehicle while securing the traveling performance of the vehicle.

2. Description of the Related Art

In recent years, various techniques have been developed for controlling a vehicle to stabilize the posture or behavior of the vehicle.

One of such techniques is a yaw moment control technique wherein different braking forces are applied, for example, to left and right braking wheels to generate a moment in a turning round direction or a restoration direction (yaw direction) on the vehicle to control so as to enhance the steering characteristic (steering state) of the vehicle such as an understeer state or an oversteer state to correct the posture of the vehicle with respect to the turning direction to achieve stabilized traveling of the vehicle.

As another technique for controlling the posture of a vehicle upon turning, a roll-over suppressing control technique is available wherein braking force is applied to a turning outer wheel or wheels to suppress a motion (rolling motion) of the vehicle in an overturning direction. According to the roll-over suppressing control, when a vehicle turns, braking force is applied to a turning outer wheel or wheels to generate a yaw moment in a turning outer direction and simultaneously slow down the vehicle to prevent an increase of the roll rate or the lateral acceleration to be generated on the vehicle body to suppress a roll-over motion.

Meanwhile, since the simplest control for stabilizing the posture or the behavior of a vehicle is to decrease the vehicle speed, also an automatic slowdown control technique is known wherein braking wheels are braked to slow down the braking wheels to control the traveling speed of the vehicle until a vehicle speed at which the vehicle can turn safely is reached.

As one of automatic slowdown control techniques, a technique is known where in the turning radius of a vehicle, the coefficient of friction of the road surface on which the vehicle is traveling, and so forth are arithmetically operated based on the lateral acceleration, forward-backward acceleration (deceleration) and so forth generated on the vehicle and the traveling speed of the vehicle is controlled to a traveling speed at which the vehicle can turn safely. In the technique, for example, when a vehicle turns, the traveling speed of the vehicle is reduced so that the vehicle can keep a state wherein the wheels sufficiently grip the road surface.

When such slowdown control is carried out, it is significant how to set a start condition and an end condition of the control. In particular, the vehicle speed should coincide with the request for a speed of the driver, and the slowdown control should not be performed indiscriminately because it is control which is carried out against the request for a speed of the driver. Therefore, it is desired to decide with a high degree of accuracy whether or not the vehicle is in a state wherein the stabilization of the posture or the behavior of a vehicle should take precedence over the request for a vehicle of the driver and carry out the slowdown control only under a situation in which the slowdown control is required.

A technique directed to a start condition and an end condition of such slowdown control for achieving stabilization of the posture or the behavior of a vehicle is disclosed, for example, in Japanese Patent Laid-Open No. 2000-62499 (hereinafter referred to as Patent Document 1). According to the technique disclosed in Patent Document 1, as an end condition of the slowdown control, if behavior control of a vehicle is started although the vehicle is not in an unstable state, then the threshold value for an end of the behavior control is changed from that used when the behavior control is started thereby to end the started behavior control rapidly.

Another technique is disclosed in Japanese Patent No. 2,572,856 (hereinafter referred to as Patent Document 2). According to the technique disclosed in Patent Document 2, if an undesired turning behavior of a vehicle cannot be suppressed only by braking of a turning inner wheel or wheels, then it is decided that the vehicle speed is excessively high, and the excessive part of the vehicle speed is suppressed by automatic braking of turning inner and outer wheels so that an undesired turning behavior may not occur. Together with this, upon the automatic braking, the turning inner and outer wheels are braked in such a mode that the yaw rate of the vehicle may be a critical yaw rate which should be obtained in the suppressed vehicle speed condition.

Incidentally, the automatic slowdown control described above is directed to braking control by which the wheels can secure sufficient force of gripping of the road surface on which the vehicle travels. Thus, the automatic slowdown control is ended when the vehicle is slowed down to a speed at which the vehicle can travel sufficiently stably with respect to the magnitude of the turning radius. The start condition or the end condition of the control in this instance may be decided, for example, based on the lateral acceleration of the vehicle.

However, if the automatic slowdown control is ended with a fixed condition, then the automatic slowdown control may possibly be continued for more than a necessary period or may possibly be ended conversely although the automatic slowdown control is required further.

In particular, if the control end condition is set such that the automatic slowdown control is ended when, for example, the lateral acceleration of the vehicle drops to a predetermined value without taking the gradient of a road along which the vehicle is traveling during turning into consideration, then where the road is an uphill road, if the automatic slowdown control is carried out until after the lateral acceleration of the vehicle drops to the predetermined value, the slowdown occurs excessively due to the road gradient. This gives rise to a situation that, even if it is tried to accelerate the vehicle after the end of the control, sufficient acceleration cannot be achieved. On the contrary, where the road is a downhill road, if the automatic slowdown control is ended, for example, based on a decision that the lateral acceleration of the vehicle has decreased to the predetermined value, then the vehicle may thereafter be accelerated again by the road gradient, resulting in the possibility that the posture or the behavior of the vehicle may be rendered unstable again.

Patent documents 1 and 2 mentioned above do not disclose a solution to the subject just described.

SUMMARY OF THE INVENTION

It is an object of the present invention to provide an automatic slowdown control apparatus for a vehicle wherein the end condition of automatic slowdown control is set in accordance with the gradient of a road so that the automatic slowdown control can be ended appropriately.

In order to attain the object described above, according to an aspect of the present invention, there is provided an automatic slowdown control apparatus for a vehicle, comprising a braking mechanism for braking wheels of the vehicle, vehicle stability parameter value detection means for detecting a parameter value of a parameter or one of parameters corresponding to a stability of the posture and/or behavior of the vehicle upon turning, automatic slowdown control means for starting automatic slowdown control of rendering the braking mechanism operative to slow down the vehicle based on the parameter value detected by the vehicle stability parameter value detection means when the parameter value is displaced to the instability side of the vehicle stability with respect to a control start threshold value set in advance and ending the automatic slowdown control when the parameter value while the automatic slowdown control is being carried out is displaced to the stability side of the vehicle stability with respect to a control end threshold value set in advance as a value on the stability side of the vehicle stability, and road gradient estimation means for estimating or detecting a road gradient of a road on which the vehicle travels, the control end threshold value having a plurality of different values set therefor corresponding to different values of the road gradient such that the vehicle stability is displaced more to the instability side as the value of the road gradient becomes higher, the automatic slowdown control means selecting one of the values of the control end threshold value in response to the value of the road gradient estimated or detected by the road gradient estimation means and deciding the end of the automatic slowdown control based on the selected value of the control end threshold value.

In the automatic slowdown control apparatus, the automatic slowdown control of rendering the braking mechanism operative to slow down the vehicle is started by the automatic slowdown control means when the parameter value detected by the vehicle stability parameter value detection means and corresponding to the stability of the posture and/or behavior of the vehicle upon turning is displaced to the instability side of the vehicle stability with respect to the control start threshold value set in advance. Consequently, the vehicle speed drops and the posture and/or the behavior of the vehicle are stabilized gradually.

Thereafter, when the parameter value is displaced to the stability side of the vehicle stability with respect to the control end threshold value set in advance as a value on the stability side of the vehicle stability, the automatic slowdown control is ended. The control end threshold value has a plurality of different values set therefor corresponding to different values of the road gradient such that the vehicle stability is displaced more to the instability side as the value of the road gradient becomes higher, and the automatic slowdown control means selects one of the values of the control end threshold value in response to the value of the road gradient estimated by the road gradient estimation means and decides the end of the automatic slowdown control based on the selected value of the control end threshold value. Consequently, as the road gradient exhibits a higher ascending gradient, the automatic slowdown control is ended comparatively rapidly without waiting that the posture or behavior of the vehicle is stabilized.

Accordingly, the automatic slowdown is prevented from being performed excessively on a road of the ascending gradient, and also when it is tried to accelerate the vehicle after the end of the automatic slowdown control, the vehicle can be accelerated comparatively rapidly. Naturally, on a flat road or a downhill road, the control end threshold value is set to a value on the stable side of the stability of the vehicle as the descending gradient of the downhill road increases. Consequently, even if the vehicle is placed into an acceleration tendency again by the road gradient after the end of the automatic slowdown control, the possibility that the posture or the behavior of the vehicle may be rendered unstable is low.

Preferably, as the control end threshold value, an uphill road control end threshold value to be used for an uphill road whose road gradient is equal to or higher than a predetermined value and a downhill road control end threshold value to be used for a downhill road whose road gradient is lower than the predetermined value are set, and the uphill road control end threshold value has a value on the unstable side of the vehicle stability with respect to the downhill road control end threshold value. With the automatic slowdown control apparatus, the end of the control can be decided very simply in response to the road gradient.

Preferably, the parameters include a lateral acceleration of the vehicle, and the vehicle stability parameter value detection means includes lateral acceleration detection means for detecting the lateral acceleration of the vehicle. With the automatic slowdown control apparatus, the stability of the posture and/or behavior of the vehicle can be detected appropriately, and a start and an end of the automatic slowdown control can be decided readily and appropriately.

In this instance, preferably the automatic slowdown control apparatus further comprises vehicle speed detection means for detecting an actual speed of the vehicle, and wherein the automatic slowdown control means includes safe traveling speed arithmetic operation means for calculating a safe traveling speed of the vehicle based on the parameters including the lateral acceleration of the vehicle in response to a turning state of the vehicle, target deceleration setting means for calculating, when the actual speed detected by the vehicle speed detection means is higher than the safe traveling speed calculated by the safe traveling speed arithmetic operation means, a target deceleration of the vehicle based on a deviation between the safe traveling speed and the actual speed, and end decision means for deciding the end of the automatic slowdown control when a state wherein the magnitude of the target deceleration calculated by the target deceleration setting means is equal to or higher than a control end threshold value set in response to the road gradient continues for a predetermined period of time set in advance or more. With the automatic slowdown control apparatus, an end of the automatic slowdown control can be decided readily and appropriately.

Preferably, the automatic slowdown control apparatus further comprises forward-backward acceleration detection means for detecting a forward-backward acceleration of the vehicle, and vehicle speed detection means for detecting the vehicle speed of the vehicle, the road gradient estimation means estimating the road gradient based on the forward-backward acceleration detection value of the vehicle detected by the forward-backward acceleration detection means and a theoretical forward-backward acceleration value of the vehicle based on the vehicle speed of the vehicle detected by the vehicle speed detection means. With the automatic slowdown control apparatus, the road gradient can be estimated readily and appropriately.

According to another aspect of the present invention, there is provided an automatic slowdown control method for a vehicle which includes a braking mechanism for braking wheels of the vehicle, and vehicle stability parameter value detection means for detecting a parameter value of a parameter or one of parameters corresponding to a stability of the posture and/or behavior of the vehicle upon turning, comprising a step of starting automatic slowdown control of rendering the braking mechanism operative to slow down the vehicle based on the parameter value detected by the vehicle stability parameter value detection means when the parameter value is displaced to the instability side of the vehicle stability with respect to a control start threshold value set in advance, a step of ending the automatic slowdown control when the parameter value while the automatic slowdown control is being carried out is displaced to the stability side of the vehicle stability with respect to a control end threshold value set in advance as a value on the stability side of the vehicle stability, the control end threshold value having a plurality of different values set therefor corresponding to different values of the road gradient such that the vehicle stability is displaced more to the instability side as the value of the road gradient becomes higher, a step, executed while the automatic slowdown control is being carried out, of estimating or detecting a road gradient of a road on which the vehicle travels and selecting one of the values of the control end threshold value in response to the estimated or detected value of the road gradient such that the end of the automatic slowdown control is decided based on the selected value of the control end threshold value.

Preferably, as the control end threshold value, an uphill road control end threshold value to be used for an uphill road whose road gradient is equal to or higher than a predetermined value and a downhill road control end threshold value to be used for a downhill road whose road gradient is lower than the predetermined value are set, and the uphill road control end threshold value has a value on the unstable side of the vehicle stability with respect to the downhill road control end threshold value.

Further, preferably, the parameters include a lateral acceleration of the vehicle.

Further preferably, the automatic slowdown control method further comprises the steps executed during the automatic slowdown control of calculating a safe traveling speed of the vehicle based on the parameters including the lateral acceleration of the vehicle in response to a turning state of the vehicle, calculating, when the detected actual speed is higher than the calculate safe traveling speed, a target deceleration of the vehicle based on a deviation between the safe traveling speed and the actual speed, and deciding the end of the automatic slowdown control when a state wherein the magnitude of the calculated target deceleration is equal to or higher than a control end threshold value set in response to the road gradient continues for a predetermined period of time set in advance or more.

Further preferably, the automatic slowdown control method further comprises the steps of detecting a forward-backward acceleration of the vehicle and the speed of the vehicle, and estimating the road gradient based on the detected forward-backward acceleration detection value of the vehicle and a theoretical forward-backward acceleration value of the vehicle based on the detected vehicle speed of the vehicle.

The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENT

In the following, a preferred embodiment of the present invention is described with reference to the drawings.

Figure 2:
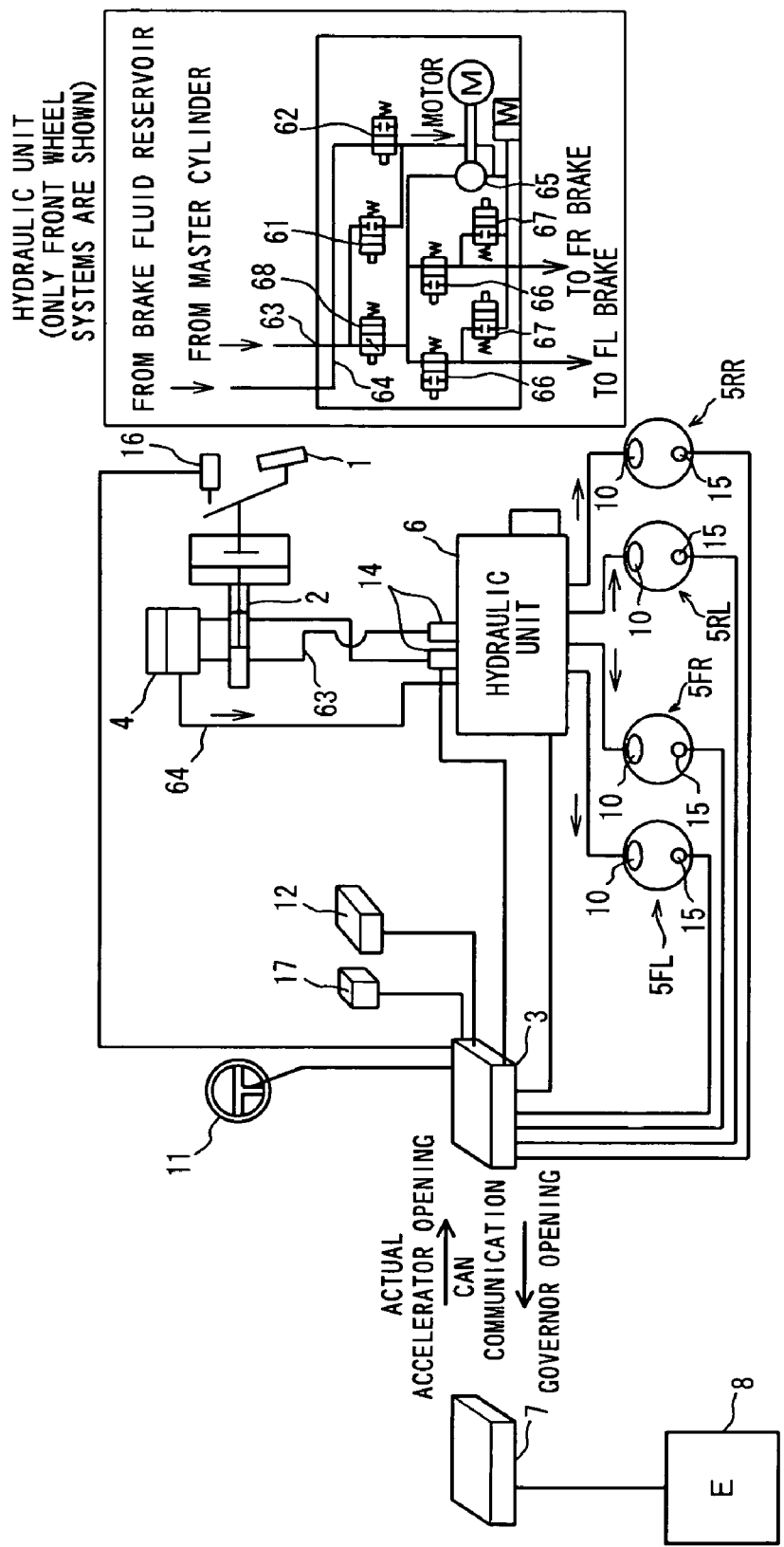
FIG. 2 is a block diagram of a brake system for a vehicle according to the embodiment of the present invention.

The vehicle behavior stabilizing control apparatus according to the present embodiment is configured using such a braking system (including a braking system) for a vehicle as shown in FIG. 2 and includes a block for carrying out yaw moment control (steering characteristic control) and another block for carrying out automatic slowdown control according to the present invention.

First, the braking system for a vehicle is described. Referring to FIG. 2, the braking system includes a brake pedal 1, a master cylinder 2 which operates in an interlocking relationship with an operation of the brake pedal 1, and a hydraulic unit 6 for controlling the brake fluid pressure to be supplied from the master cylinder 2 or a brake fluid reservoir 4 to wheel cylinders of wheel brakes (hereinafter referred to simply as brakes) 10 for braking wheels (front left and right wheels and rear left and right wheels) 5FL, 5FR, 5RL, 5RR in response to the state of the master cylinder 2 or in accordance with an instruction from a braking controller (brake ECU) 3. It is to be noted here that a braking mechanism is formed from a hydraulic pressure adjusting system including the master cylinder 2, hydraulic unit 6 and so forth, the wheel brakes 10 for the braking wheels, and so forth.

As seen in FIG. 2 (in FIG. 2, only the left and right wheel brakes for the front wheels are shown), a differential pressure valve 68 in the hydraulic unit 6 operates in a vehicle behavior control mode so that a predetermined pressure difference may appear between the upstream and the downstream of the differential pressure valve 68.

When the vehicle is in the behavior control mode and the brake pedal 1 is not operated, an in-line intake valve 61 is closed while an out-line intake valve 62 is opened. Consequently, the brake fluid in the brake fluid reservoir 4 is introduced through an out-line 64 and the out-line intake valve 62 into a pump 65 and is pressurized by the pump 65, and the pressure of the brake liquid is adjusted by a fluid pressure holding valve 66 and a pressure reducing valve 67 and the brake fluid of the adjusted pressure is supplied to the brakes 10 for the wheels.

On the other hand, when the vehicle is in the behavior control mode and the brake pedal 1 is operated, since the in-line intake valve 61 is opened and the out-line intake valve 62 is closed, the brake fluid in the master cylinder 2 is introduced through an in-line 63 and the in-line intake valve 61 into the pump 65 and is pressurized by the pump 65. Then, the pressure of the brake fluid is adjusted by the liquid pressure holding valve 66 and the pressure reducing valve 67, and the brake fluid of the adjusted pressure is supplied to the brakes 10 for the wheels.

It is to be noted that the in-line 63 and the out-line 64 join together on the downstream of the in-line intake valve 61 and the out-line intake valve 62, and the pump 65 is disposed on the downstream of the joining location. The liquid pressure holding valve 66 and the pressure reducing valve 67 are provided for each of the braking wheels 5FL, 5FR, 5RL, 5RR on the downstream of the pump 65.

Upon normal braking, the in-line intake valve 61 and the out-line intake valve 62 are closed, and the differential pressure valve 68 and the liquid pressure holding valve 66 are opened while the pressure reducing valve 67 is closed. Consequently, a brake fluid pressure corresponding to the pressure (that is, braking operation force) in the master cylinder 2 is supplied to the brake 10 for each of the wheels through the in-line 63, differential pressure valve 68 and liquid pressure holding valve 66. On the other hand, when an ABS (antilock brake system or antiskid brake system) operates, a brake fluid pressure corresponding to the braking operation force is suitably adjusted through the liquid pressure holding valve 66 and the pressure reducing valve 67 so that each wheel may not be locked.

The in-line intake valve 61, out-line intake valve 62, pump 65, and liquid pressure holding valves 66, pressure reducing valves 67 and differential pressure valve 68 for the braking wheels of the hydraulic unit 6 having such a configuration as described above are controlled by the brake ECU 3.

Various signals are inputted to the brake ECU 3. In particular, a steering wheel angle signal is inputted from a steering wheel angle sensor 11 provided for the steering wheel, and a yaw rate signal of the vehicle body is inputted from a yaw rate sensor 12 provided on the vehicle body. Further, a master cylinder fluid pressure signal is inputted from a master cylinder fluid pressure sensor 14, and a wheel speed signal is inputted from a wheel speed sensor 15 provided for each wheel. Furthermore, a brake pedal operation signal is inputted from a brake switch 16, and a forward-backward acceleration signal and a lateral acceleration signal are inputted from a forward-backward and lateral acceleration sensor 17 provided on the vehicle body. It is to be noted that each of the forward-backward acceleration and the lateral acceleration corresponds to a parameter representative of the stability of the posture and/or the behavior of the vehicle upon turning, and the forward-backward and lateral acceleration sensor 17 corresponds to vehicle stability parameter value detection means for detecting the parameter value.

Figure 1:
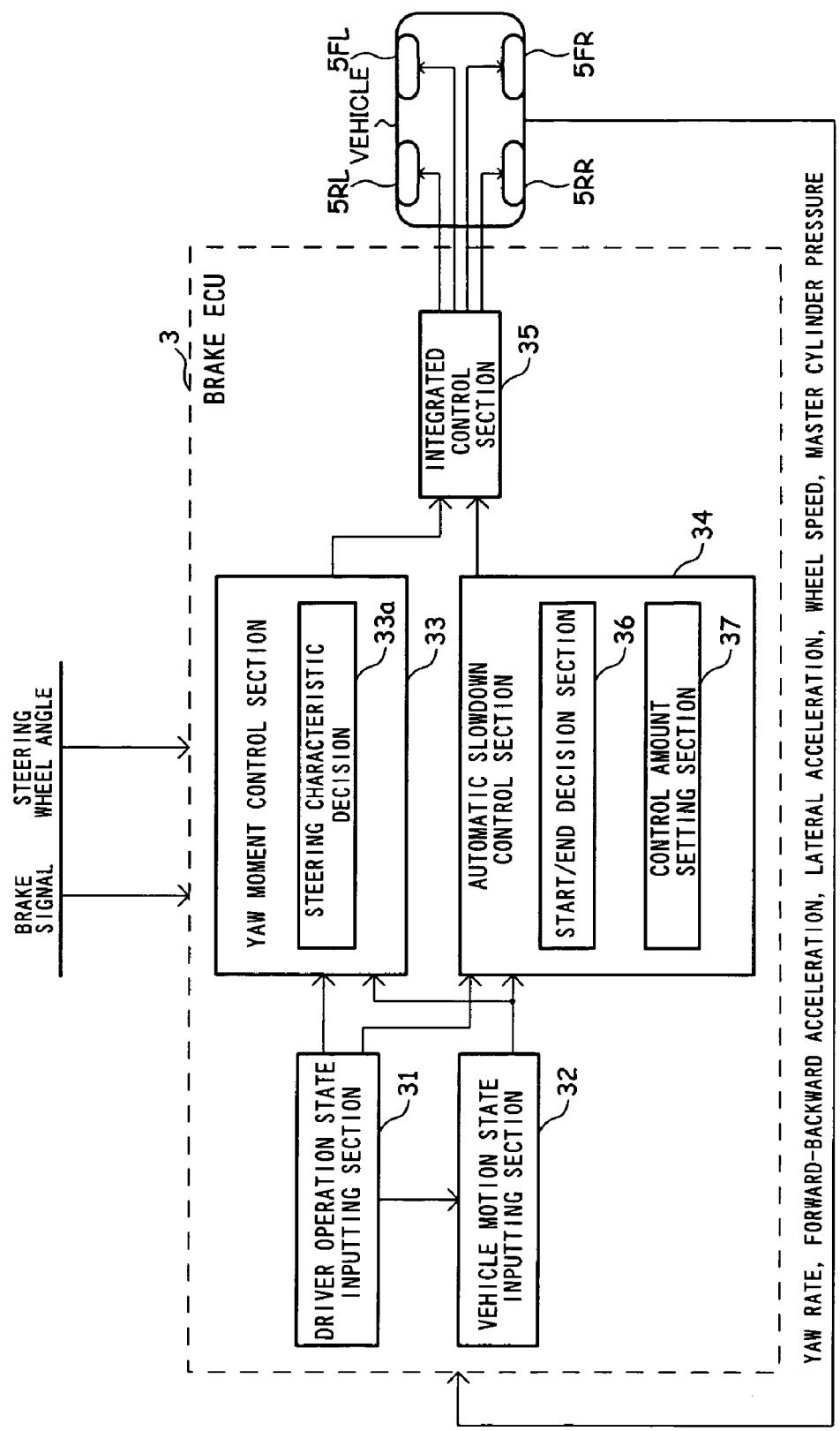
FIG. 1 is a block diagram showing a configuration of a vehicle behavior stabilizing control apparatus including an automatic slowdown control apparatus for a vehicle according to an embodiment of the present invention.

The brake ECU 3 includes such various functional elements as seen in FIG. 1. Referring to FIG. 1, the brake ECU 3 includes a driver operation state inputting section 31 for receiving various kinds of information relating to an operation state of the driver as inputs thereto and suitably processing and outputting the input information. The brake ECU 3 further includes a vehicle motion state inputting section 32 for receiving various kinds of information relating to an action condition (behavior) of the vehicle as inputs thereto and suitably processing and outputting the input information. The brake ECU 3 further includes a yaw moment control section (steering characteristic control means) 33, an automatic slowdown control section 34, and an integrated control section 35.

The driver operation state inputting section 31 discriminates based on the brake pedal operation signal from the brake switch 16 whether or not the vehicle is being braked.

The vehicle motion state inputting section 32 recognizes an actual yaw rate generated on the vehicle body from a yaw rate signal inputted from the yaw rate sensor 12 and calculates a vehicle body speed, target yaw rate and a yaw rate deviation. Although the vehicle body speed (vehicle speed) is normally calculated based on wheel speed signals from the wheel speed sensors 15, if a slip occurs with a wheel, then the vehicle motion state inputting section 32 adds a time integrated value of the forward-backward acceleration obtained from the forward-backward and lateral acceleration sensor 17 to the vehicle body speed based on the wheel speed signal till then to calculate the vehicle body speed (in this instance, the calculated vehicle body speed is an estimated vehicle body speed). Accordingly, the wheel speed sensors 15 and the vehicle motion state inputting section 32 have a function as vehicle speed detection means.

Figure 3:
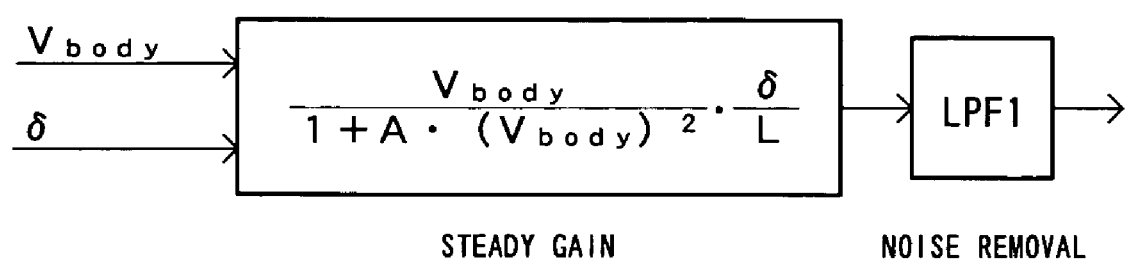
FIG. 3 is a control block diagram illustrating calculation of a target yaw rate according to behavior stabilization control (yaw moment control) of the vehicle behavior stabilizing control apparatus.

The target yaw rate $Yaw_{tgt}$ is a yaw rate to be originally generated on the vehicle and is determined by calculating a value thereof in accordance with the expression (1) given below from the vehicle body speed $V_{body}$ obtained in such a manner as described hereinabove and an actual steering angle (steering wheel angle) $\delta$ obtained from the steering wheel angle signal from the steering wheel angle sensor 11 and then processing the calculated value using a low-pass filter to remove noise from the value as seen in FIG. 3:

$$Yaw_{tgt} = LPF \cdot \left( \frac{V_{body}}{1 + A \cdot V_{body}^2} \cdot \frac{\delta}{L} \right) \tag{1}$$

where A is the stability factor of the vehicle, and L the wheel base of the vehicle.

The yaw rate deviation $\Delta Yaw$ is calculated as a difference between the target yaw rate $Yaw_{tgt}$ and the actual yaw rate $Yaw_{body}$ recognized by the vehicle motion state inputting section 32 in accordance with the following expression (2):

$$\Delta Yaw = Yaw_{tgt} - Yaw_{body} \tag{2}$$

It is to be noted that the sign of the yaw rate deviation $\Delta Yaw$ is determined in the following manner and the calculation above is executed with of the yaw rate deviation $\Delta Yaw$ of the determined sign. In particular, for example, the rightward yaw rate direction is set as the positive direction such that the yaw rate deviation $\Delta Yaw$ has the positive sign when the vehicle is in an understeer state but has the negative sign when the vehicle is an oversteer state, and when the yaw rate direction is the leftward direction, the sign thereof is converted (the yaw rate is multiplied by $-1$) and a resulting value is used for the calculation above.

The yaw moment control section (steering characteristic control means) 33 performs yaw moment control (steering characteristic control) in response to the yaw rate deviation $\Delta Yaw$ if a predetermined start condition is satisfied. The start condition of the yaw moment control is that both of a condition (1-1) that the vehicle body speed $V_{body}$ is equal to or higher than a reference value (low speed value set in advance) $V_1$ and another condition (1-2) that the yaw rate deviation $\Delta Yaw$ is higher than an in-understeer start decision threshold value $\Delta Yaw_{us1}$ or an in-oversteer start decision threshold value $\Delta Yaw_{us1}$. If both of the conditions are satisfied, then the yaw moment control is started. It is to be noted that the decision function of the condition (1-2) of the yaw moment control section 33 is referred to as a steering characteristic decision section 33a.

Figure 4:
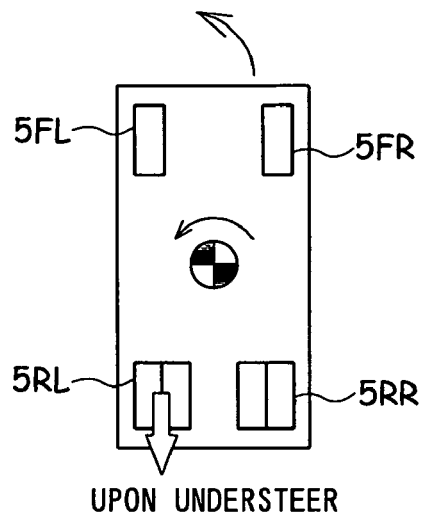
FIGS. 4(a1), 4(a2), 4(b1) and 4(b2) are schematic plan views of a vehicle illustrating yaw moment control by the automatic slowdown control apparatus.
Figure 4:
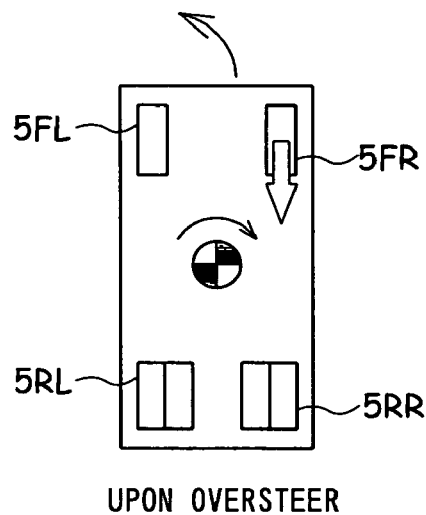
Figure 4:
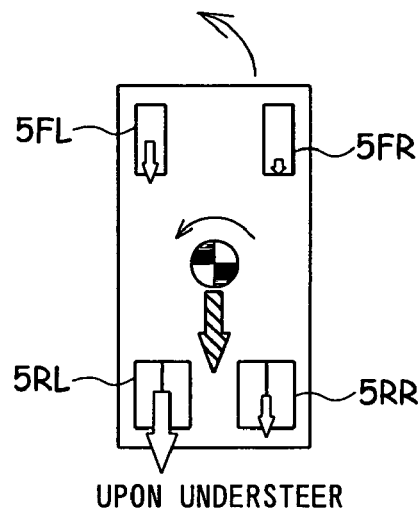
Figure 4:
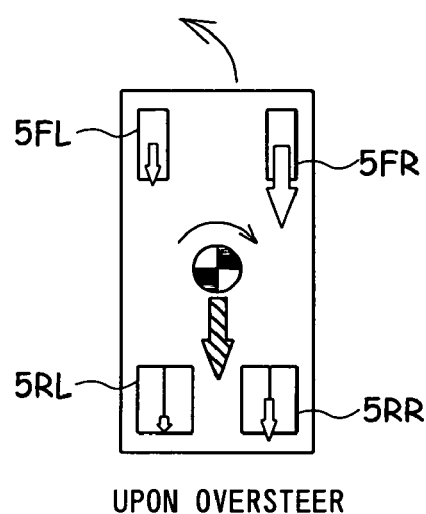
Figure 4:
Figure 4:
Figure 4:

In the yaw moment control, when the vehicle is in an understeer state, the braking force to a turning inner wheel or wheels is raised and the braking force to a turning outer wheel or wheels is decreased. In this instance, if the braking force is applied only to the rear wheel from between the turning inner wheels, then the understeer can be suppressed smoothly and efficiently without slowing down the vehicle excessively. In particular, the braking force to be applied (more particularly, the brake fluid pressure to be applied) or the braking force to be increased or decreased (more particularly, the brake fluid pressure to be increased or decreased) is set such that, if the brake is not being operated, then the rear wheel 5RL or 5RR from between the turning inner wheels as seen in FIG. 4(a1), but if the brake is being operated, then the braking force to the rear wheel 5RL or 5RR from between the turning inner wheels is increased while the braking force to the front wheel 5FR or 5FL from between the turning outer wheels is decreased. Further, the braking force application amount or the braking force increasing and decreasing amounts are set in response to the yaw rate deviation $\Delta Yaw$ such that the values thereof increase as the magnitude of the yaw rate deviation $\Delta Yaw$ increases.

Further, in the yaw moment control, when the vehicle is in an oversteer state, the braking force to a turning outer wheel or wheels is raised and the braking force to a turning inner wheel or wheels is decreased. In this instance, if the braking force is applied only to the front wheel from between the turning outer wheels, then the oversteer can be suppressed smoothly and efficiently without slowing down the vehicle excessively. In particular, the braking force to be applied (more particularly, the brake fluid pressure to be applied) or the braking force to be increased or decreased (more particularly, the brake fluid pressure to be increased or decreased) is set such that, if the brake is not being operated, then the braking force is applied to the front wheel 5FL or 5FR from between the turning outer wheels as seen in FIG. 4(b1), but if the brake is being operated, then the braking force to the front wheel 5FL or 5FR from between the turning outer wheels is increased while the braking force to the rear wheel 5RR or 5RL from between the turning inner wheels is decreased. Further, the braking force application amount or the braking force increasing and decreasing amounts are set in response to the yaw rate deviation $\Delta Yaw$ such that the values thereof increase as the magnitude of the yaw rate deviation $\Delta Yaw$ increases.

On the other hand, if a predetermined end condition is satisfied during the yaw moment control, then the yaw moment control (steering characteristic control) is ended. The end condition of the yaw moment control is that any one of a condition (2-1) that the vehicle body speed $V_{body}$ is equal to or lower than a reference value (low speed value set in advance) $V_2$ (where $V_2 < V_1$) and another condition (2-2) that the yaw rate deviation $\Delta Yaw$ is within an in-understeer end decision threshold value or an in-oversteer end decision threshold value. If any one of the conditions is satisfied, then the yaw moment control is ended.

The automatic slowdown control section 34 performs its control when the grip of a wheel (tire) of the vehicle during turning reaches its limit and the vehicle tends to travel along a traveling path displaced from a turning path along which the vehicle should originally travel, and slows down the vehicle to prevent such movement of the vehicle as the control thereof. In the automatic slowdown control, the braking force is applied to all of the four wheels because the object of the braking is the slowdown of the vehicle. Further, the automatic slowdown control section 34 starts the automatic slowdown control if a predetermined control start condition including not only a prerequisite that the yaw moment control is being carried out but also a condition regarding the behavior of the vehicle such as a condition that the lateral acceleration of the vehicle exceeds a control start threshold value corresponding to the road $\beta$ of the road surface on which the vehicle travels is satisfied. Then, if a predetermined control end condition such as a condition that the yaw moment control is ended or a condition regarding the behavior of the vehicle such as a condition that the lateral acceleration of the vehicle converges in a control end threshold value corresponding to a road gradient of the road surface on which the vehicle travels is satisfied, then the automatic slowdown control is ended.

Further, during the automatic slowdown control, the control amount is set such that, although, in a normal state (when the understeer tendency is not excessive), the braking force to be applied to the wheels is adjusted so that the vehicle is slowed down to a predetermined speed, but if the understeer tendency becomes excessive, then the braking force to be applied to the wheels is increased at the highest rate so that the vehicle may be slowed down as rapidly as possible.

To this end, the automatic slowdown control section 34 includes a start/end decision section (vehicle behavior decision means) 36 for deciding a start and an end of the automatic slowdown control, and a control amount setting section 37 for setting the control amount regarding braking when the automatic slowdown is to be carried out.

The start condition of the automatic slowdown control is that all of a condition (3-1) that the target deceleration $gx_{tgt}$ is lower than a control start threshold value $gx_{trcs}$ (that the target deceleration $gx_{tgt}$ is an excessive deceleration higher than the control start threshold value $gx_{trcs}$), another condition (3-2) that the vehicle body speed $V_{body}$ is equal to or higher than the reference value $V_1$, a further condition (3-3) that the brake is not being operated by the user and a still further condition (3-4) that the yaw moment control is proceeding, which is the prerequisite, are satisfied.

Among the conditions, the condition (3-1) corresponds to the fact that the vehicle body speed $V_{body}$ is excessively high and slowdown by a fixed amount or more is required. In particular, since a value of the acceleration is represented by the positive sign while a value of the deceleration is represented by the negative sign, that the target deceleration $gx_{tgt}$ is lower than the control start threshold value $gx_{trcs}$ corresponds to the fact that the magnitude $|gx_{tgt}|$ of the target deceleration is equal to or higher than the predetermined value $|gx_{trcs}|$. Accordingly, the condition (3-1) corresponds to the fact that slowdown of the vehicle by a predetermined amount or more is required.

Figure 5:
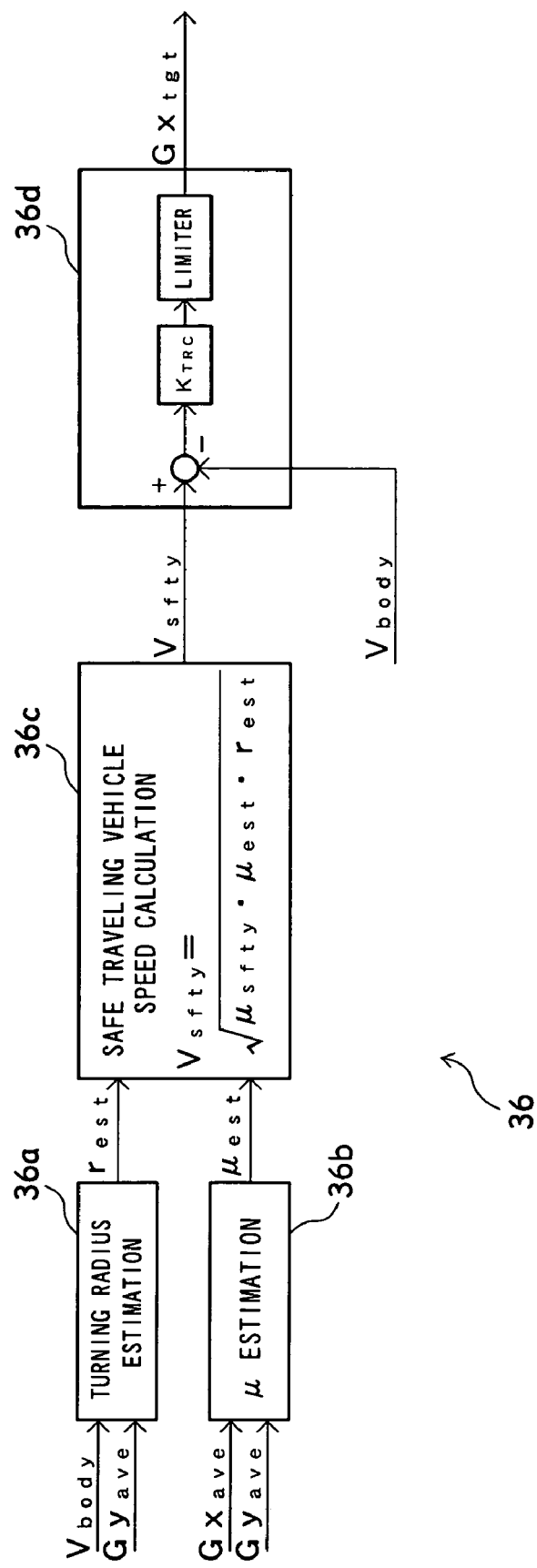
FIGS. 5 to 8 are control block diagrams illustrating slowdown control by the automatic slowdown control apparatus.
Figure 6:
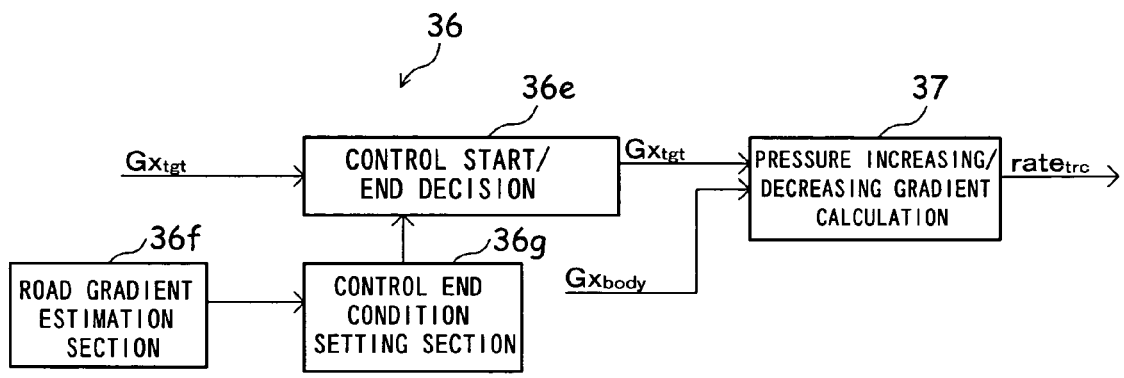

Here, the target deceleration $gx_{tgt}$ used in the condition (3-1) is described. Referring to FIGS. 5 and 6, the start/end decision section 36 includes a function (turning radius estimation section) 36a of estimating the turning radius of the vehicle, another function (load $\mu$ estimation section) 36b of estimating the road surface $\mu$ of the road surface on which the vehicle is traveling, a further function (safe traveling vehicle speed arithmetic operation section as safe upper limit speed estimation section) 36c of calculating a safe traveling vehicle speed $V_{sfty}$ from the turning radius and the road surface μ estimated by the estimation sections 36a and 36b, a still further function (target deceleration setting section) 36d of calculating a target deceleration $gx_{tgt}$ from the deviation between the safe traveling vehicle speed $V_{sfty}$ calculated by the safe traveling vehicle speed arithmetic operation section 36c and the actual vehicle speed (vehicle body speed) $V_{body}$ calculated by the vehicle motion state inputting section 32, and a yet further function (decision section) 36e of deciding a start and an end of the automatic slowdown control based on the target deceleration $gx_{tgt}$ and so forth.

The turning radius estimation section 36a calculates the turning radius $r_{est}$ in accordance with the following expression (3) from an average lateral acceleration $gy_{ave}$ obtained by processing the lateral acceleration by means of the forward-backward acceleration sensor 17 using a low-pass filter and the vehicle body speed $V_{body}$ calculated by the vehicle motion state inputting section 32:

$$r_{est} = V_{body}^2 / gy_{ave} \quad (3)$$

The road μ estimation section 36b calculates the road surface μ $\mu_{est}$ in accordance with the following expression (4) from an average forward-backward acceleration $gx_{ave}$ and an average lateral acceleration $gy_{ave}$ obtained by processing the forward-backward acceleration and the lateral acceleration detected by the forward-backward acceleration sensor 17 using of a low-pass filter:

$$\mu_{est} = (1/G) \cdot \sqrt{gx_{ave}^2 + gy_{ave}^2} \quad (4)$$

where G is the acceleration of gravity.

The calculation of the road μ is performed under the condition that the vehicle is in a critical traveling state (is traveling with a critical grip of the tires). That the vehicle is in a critical traveling state corresponds to that the yaw moment control which is a prerequisite of the automatic slowdown control is being proceeding, but also to that the four-wheel ABS is operative or the yaw rate deviation ΔYaw is excessively great (higher than a predetermined value).

The safe traveling vehicle speed arithmetic operation section 36c calculates a safe traveling vehicle speed $V_{sfty}$ in accordance with the following expression (5) from the turning radius $r_{est}$ estimated in such a manner as described above, road surface μ:$\mu_{est}$ and a safety coefficient $\mu_{sfty}$ set in advance:

$$V_{sfty} = \sqrt{\mu_{sfty} \cdot \mu_{est} \cdot G \cdot r_{est}} \quad (5)$$

The target deceleration setting section 36d decides a target deceleration $gx_{tgt}$ by multiplying the deviation ΔV (=$V_{sfty}$−$V_{body}$) between the safe traveling vehicle speed $V_{sfty}$ and the actual vehicle speed $V_{body}$ by a feedback gain $K_{trc}$:

$$gx_{tgt} = K_{trc} \cdot (V_{sfty} - V_{body}) \quad (6)$$

It is to be noted, however, that the target deceleration $gx_{tgt}$ is processed by a limiter process within a predetermined range.

Accordingly, that the target deceleration $gx_{tgt}$ calculated in this manner is lower than a threshold value (that the target deceleration $gx_{tgt}$ is excessive to the slowdown side) signifies that the vehicle speed at present is excessively high with respect to the turning radius of curvature and the road μ of the road on which the vehicle is traveling and that the lateral acceleration is generated excessively with respect to the road μ of the road on which the vehicle is traveling, and hence to that slowdown of the vehicle is required.

The start condition (3-2) of the automatic slowdown control is set because, where the vehicle speed is very low, it is easy to stabilize the behavior of the vehicle by an operation of the driver and the automatic slowdown control is not required particularly.

Further, the start condition (3-3) of the automatic slowdown control is set taking a case wherein the driver performs a slowdown operation when the vehicle is in a critical driving state into consideration. In particular, the start condition (3-3) is set because, if the driver performs a slowdown operation, then even if not only automatic slowdown but also slowdown corresponding to the slowdown operation are performed, the behavior of the vehicle can be controlled toward the stability and besides, if slowdown is performed in a manner different from that by the slowdown operation of the driver, then it gives an unfamiliar feeling to the driver.

Further, while that "the yaw moment control is proceeding" of the start condition (3-4) of the automatic slowdown control is a prerequisite of the present control, this is intended to use the automatic slowdown control when the behavior of the vehicle cannot be enhanced sufficiently even if yaw moment control which exhibits a high efficiency is first used to enhance the behavior of the vehicle. In particular, although not only the yaw moment control but also the automatic slowdown control are used to lower the vehicle speed more than that corresponding to the intention of the driver, since the automatic slowdown control has a stronger tendency in this regard, the automatic slowdown control is carried out to a necessary but minimum degree.

The decision section 36e decides a start of the automatic slowdown control based on the conditions (3-1) to (3-4) of the control start conditions while the yaw moment control is proceeding as seen in FIG. 6.

On the other hand, the end condition of the automatic slowdown control is that any one of a condition (4-1) that a state wherein the target deceleration $gx_{tgt}$ is equal to or higher than the control end threshold value $gx_{trce}$ (a state wherein the magnitude of the target deceleration $gx_{tgt}$ is equal to or lower than the control end threshold value $gx_{trce}$) continues for a predetermined period of time or more, another condition (4-2) that the vehicle body speed $V_{body}$ is equal to or lower than the fixed speed $V_2$, a further condition (4-3) that the yaw moment control is ended already, and (4-4) that the brake is operated by the driver is satisfied.

It is to be noted that the control end threshold value $gx_{trce}$ is set equal to or higher than the control start threshold value $gx_{tres}$. Since both of the control end threshold value $gx_{trce}$ and the control start threshold value $gx_{tres}$ are decelerations (negative values), the magnitude |$gx_{trce}$| of the control end threshold value $gx_{trce}$ is equal to or smaller than the magnitude |$gx_{tres}$| of the control start threshold value $gx_{tres}$.

However, the end condition (4-1) of the automatic slowdown control is set in response to the gradient of the road along which the vehicle is traveling. Therefore, as seen in FIG. 6, the start/end decision section 36 includes a function (road gradient estimation section) 36f of estimating the gradient of the road on which the vehicle is traveling, and an end condition setting section 36g of setting an end condition of the automatic slowdown control in response to the road gradient estimated by the road gradient estimation section 36f.

Figure 13:
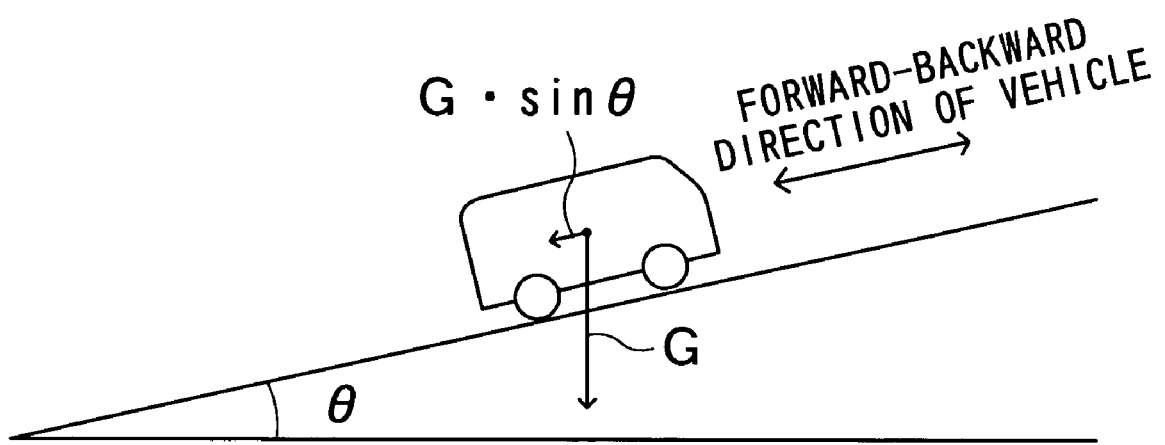
FIG. 13 is a schematic view illustrating a road gradient used in the control by the automatic slowdown control apparatus.

The road gradient estimation section 36f estimates the road gradient based on a theoretical forward-backward acceleration dV/dt determined by time differentiating the actual forward-backward acceleration $gx_{body}$ detected by the forward-backward acceleration sensor 17 and the vehicle speed (vehicle body speed) calculated based on the wheel speed signal from the wheel speed sensor 15 (time differentiates the wheel speed and multiplies a resulting value by a vehicle speed conversion rate). In particular, the acceleration determined by time differentiating the wheel speed or the vehicle speed is a forward or backward acceleration of the vehicle corresponding to the acceleration or deceleration of the vehicle, and the forward or backward acceleration which acts actually on the vehicle includes not only a component arising from the acceleration of the vehicle but also another component arising from the road gradient. Here, if the road gradient is indicated by an inclination angle $\theta$ which has a positive value where the road gradient is of an uphill road but has a negative value where the road gradient is of a downhill road, then a vehicle forward-backward component ($g \cdot \sin \theta$) of the gravitational acceleration $g$ applied to the vehicle acts as the forward-backward acceleration of the vehicle (refer to FIG. 13).

Accordingly, the actual forward-backward acceleration $gx_{body}$ detected is the sum of the forward-backward acceleration $dV/dt$ originating from the increase or decrease of the speed of the vehicle and the vehicle forward-backward acceleration component ($G \cdot \sin \theta$) by the gravitational acceleration $g$ originating from the road gradient (inclination angle $\theta$) as given by the following expression (7):

$$gx_{body} = dV/dt - G \cdot \sin \theta \quad (7)$$

$$\therefore \sin \theta = (dV/dt - gx_{body})/G \quad (7')$$

Accordingly, the inclination angle $\theta$ of the road gradient can be calculated in accordance with the following expression (8):

$$\theta = \sin^{-1}[(dV/dt - gx_{body})/G] \quad (8)$$

The end condition setting section 36g compares the value of the road gradient $\theta$ calculated (estimated) in this manner with a predetermined value $\theta 1$ set in advance ($\theta 1$ is an angle corresponding to a predetermined ascending gradient, and $\theta 1 > 0$). If the road gradient $\theta$ is an ascending gradient equal to or higher than the predetermined value $\theta 1$, then the end condition setting section 36g sets an uphill road control end threshold value $gx_{trce}1$ and uphill road control end decision time t1, but if the road gradient $\theta$ is an ascending gradient lower than the predetermined value $\theta 1$ (that is, the road is a little ascending uphill road, a flat horizontal road or a downhill road), then the end condition setting section 36g sets a normal control end threshold value $gx_{trce}2$ and normal control end decision time t2.

It is to be noted that the uphill road control end threshold value $gx_{trce}1$ is lower than the normal control end threshold value $gx_{trce}2$ (that is, greater side of the deceleration) ($gx_{trce}1 < gx_{trce}2$), and the uphill road control end decision time t1 is set shorter than the normal control end decision time t2 (t1 < t2).

The decision section 36e decides an end of the automatic slowdown control based on the control end conditions (4-1) to (4-4), particularly in the case of the control end condition (4-1), based on the end condition set in response to the road gradient.

The control amount setting section 37 sets an increasing/decreasing pressure gradient (increasing/decreasing pressure amount in a unit of a control cycle) of the brake fluid pressure in response to the deviation between the target deceleration $gx_{tgt}$ and the actual deceleration $gx_{body}$ as seen in FIG. 6, and the brake fluid pressure control of the four wheels is performed based on the increasing/decreasing pressure gradient. In particular, if the target deceleration $gx_{tgt}$ is greater to the slowdown side than the actual deceleration $gx_{body}$, then the control amount setting section 37 sets an increasing pressure gradient rate$_{trc}$ of the brake fluid pressure in response to the deviation between them, but if the target deceleration $gx_{tgt}$ is lower to the slowdown side than the actual deceleration $gx_{body}$, then the control amount setting section 37 sets a decreasing pressure gradient rate$_{trc}$ of the brake fluid pressure in response to the deviation between them.

Figure 7:
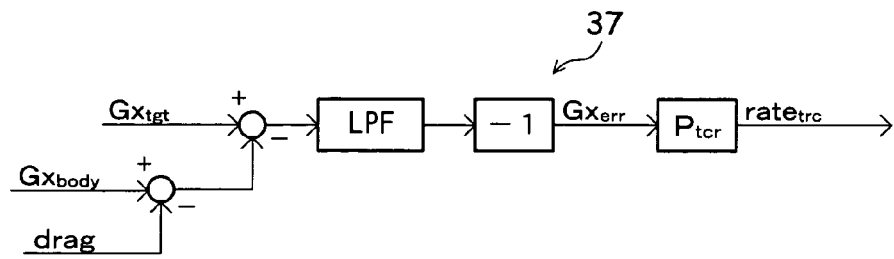
Figure 8:
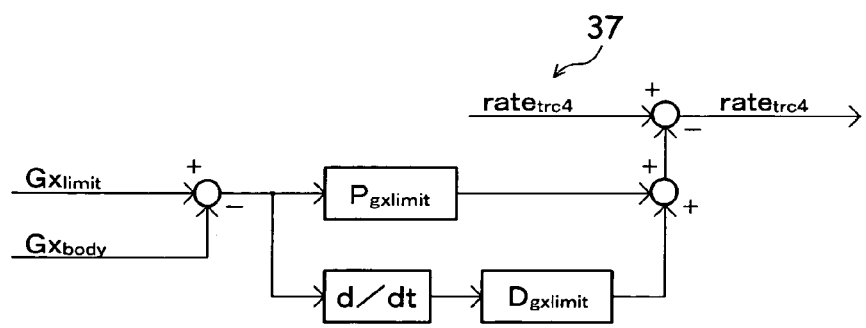
Figure 9:
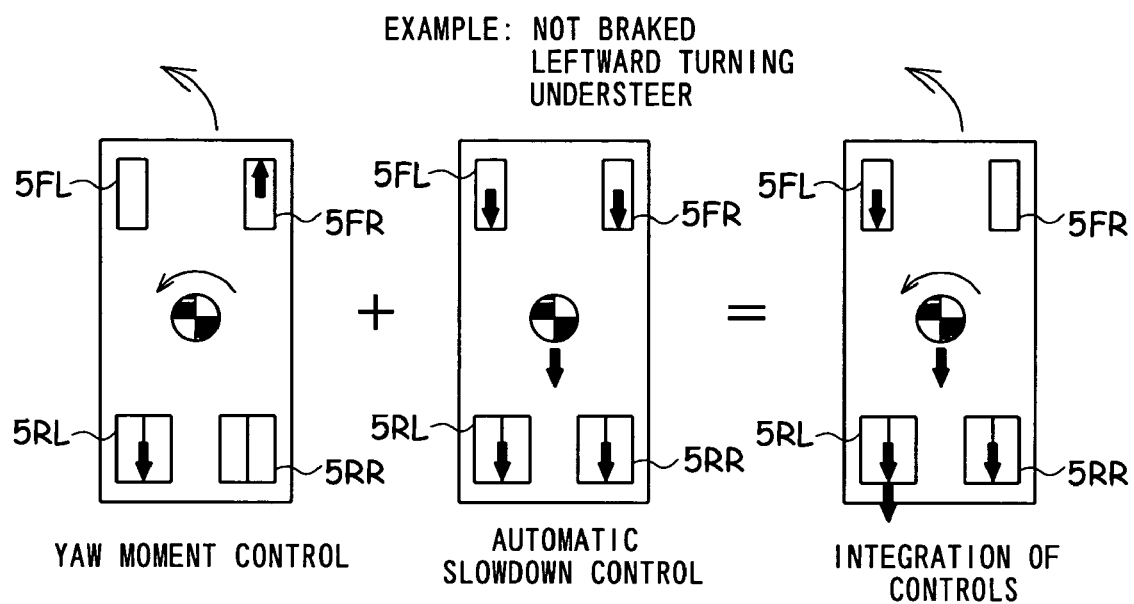
FIG. 9 is a schematic plan view of a vehicle illustrating automatic slowdown control by the automatic slowdown control apparatus.

Setting of the increasing/decreasing pressure gradient rate$_{trc}$ is described more particularly. The control amount setting section 37 sets a control amount in such a manner as seen in FIG. 7. Referring to FIG. 7, the control amount setting section 37 calculates a difference ($=gx_{tgt}-(gx_{body}-$drag)) between the target deceleration $gx_{tgt}$ and a difference ($=gx_{body}-$drag) of a cornering drag drag from the actual deceleration $gx_{body}$ and averages the calculated difference by means of a low-pass filter, whereafter the control amount setting section 37 performs a positive/negative sign conversion process for a resulting value to calculate a deceleration deviation $gx_{err}$. Then, the control amount setting section 37 multiplies the deceleration deviation $gx_{err}$ by a automatic deceleration proportional gain $P_{trc}$ to set an increasing/decreasing pressure gradient rate$_{trc}$ of the brake fluid pressure.

Further, the control amount setting section 37 adopts a sudden slowdown mode for fully increasing the brake fluid pressure for the four wheels if the yaw rate deviation $\Delta$Yaw becomes higher than a threshold value Yaw$_{s1}$ during the automatic slowdown. In the sudden slowdown mode, the control amount (increasing pressure gradient) rate$_{trc}$ is set to a full pressure increasing pressure gradient rate$_{trc4}$ so that the pressure increasing rate of the brake fluid pressure (working fluid pressure) may be the highest.

The full pressure increasing control is ended if the automatic slowdown ends or the yaw rate deviation $\Delta$Yaw decreases to a value lower than a predetermined threshold value Yaw$_{s2}$ (Yaw$_{s2}$ < Yaw$_{s1}$).

It is to be noted, however, that the full pressure increasing control maximizes the pressure increasing rate of the brake fluid pressure (working fluid pressure) within a range within which the deceleration of the vehicle does not become excessive, that is, suppresses the value of the full pressure increasing pressure gradient rate$_{trc4}$ when the actual deceleration $gx_{body}$ exceeds a limit value therefor.

In particular, a limit value $gx_{limit}$ to the deceleration is set in advance. The deceleration limit value $gx_{limit}$ is a theoretical limit value to the forward-backward acceleration which can be generated on the vehicle based on a grip characteristic of the vehicle and so forth or a value corresponding to the theoretical limit value. Then, the difference ($=gx_{limit}-gx_{body}$) between the deceleration limit value $gx_{limit}$ and the actual deceleration $gx_{body}$ is arithmetically operated, and if the difference $\Delta gx$ has a positive value, that is, if the actual deceleration $gx_{body}$ is higher to the slowdown side than the deceleration limit value $gx_{limit}$, then a value obtained by multiplying the difference $\Delta gx$ by a proportional gain $P_{gxlimit}$ and another value obtained by multiplying a differentiated value of the difference $\Delta gx$ by a proportional gain $D_{gxlimit}$ are subtracted from the value of the full pressure increasing pressure gradient rate$_{trc4}$ to correct the full pressure increasing pressure gradient rate$_{trc4}$.

This is because, where the actual deceleration of the vehicle is lower than the theoretical limit deceleration (the magnitude of the actual deceleration is greater than the magnitude of the deceleration limit value), since it is considered that the vehicle is in an excessively slowed down state by the full pressure increasing control of the brake fluid pressure and there is the possibility that this may render the behavior of the vehicle unstable, it is intended to suppress the increase of the brake fluid pressure in response to the difference between the actual deceleration and the deceleration limit value.

The integrated control section 35 sets a control amount (increasing/decreasing pressure gradient of the brake fluid pressure) with which, when control by the automatic slowdown control section 34 is performed in addition to the yaw moment control by the yaw moment control section 33, the two controls are performed in an integrated manner. The control amount basically is a sum value of the increasing/decreasing pressure gradient set for the yaw moment control by the yaw moment control section 33 and the increasing/decreasing pressure gradient set by the control amount setting section 37 of the automatic slowdown control section 34. However, this similarly applies also where the full pressure increasing control is executed by the automatic slowdown control section 34. In this instance, where the actual deceleration $gx_{body}$ is higher to the slowdown side than the deceleration limit value $gx_{limit}$, the correction described hereinabove is performed for the value of the full pressure increasing pressure gradient rate$_{trc4}$.

Figure 10:
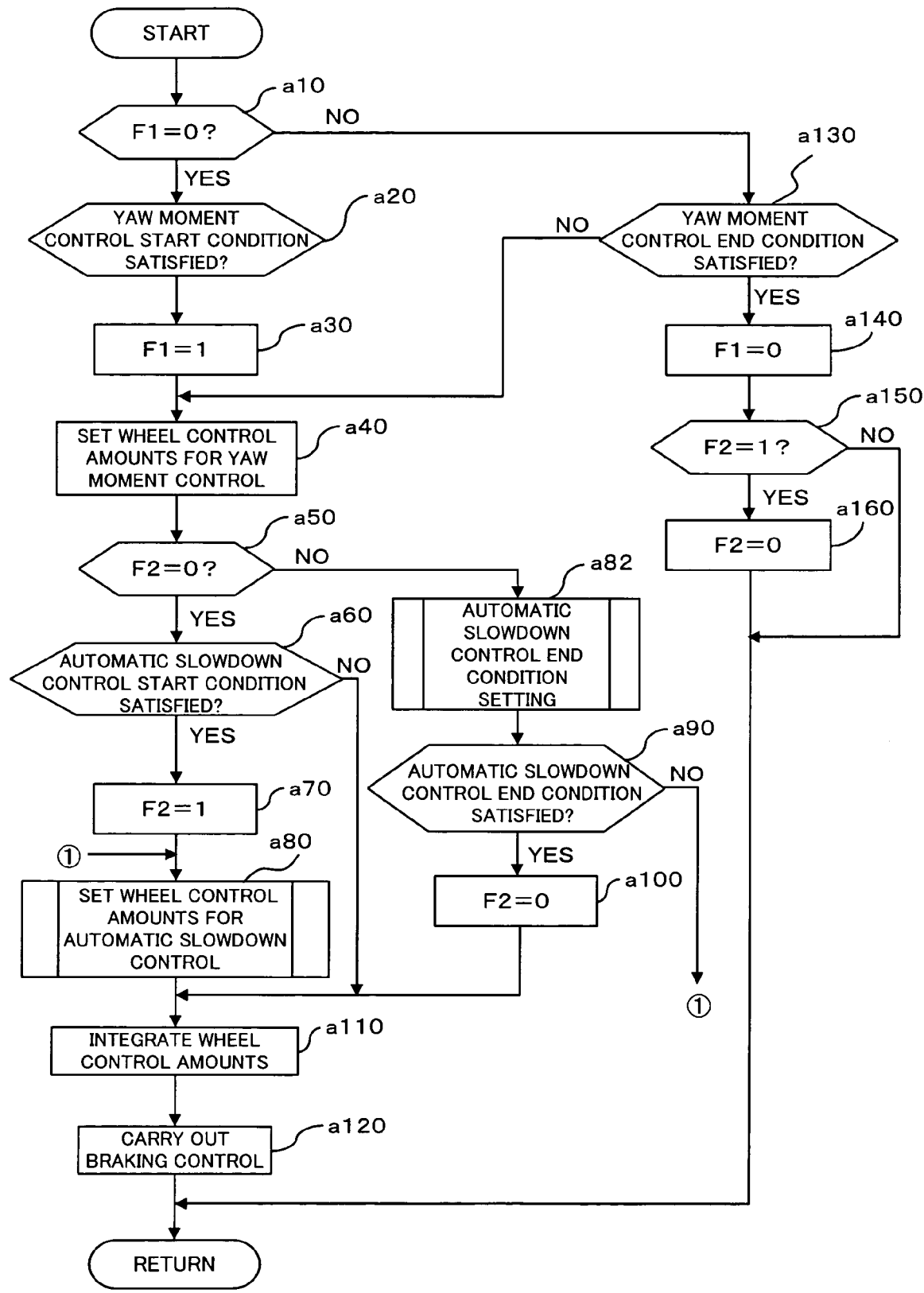
FIGS. 10 to 12 are flow charts illustrating the automatic slowdown control by the automatic slowdown control apparatus.
Figure 11:
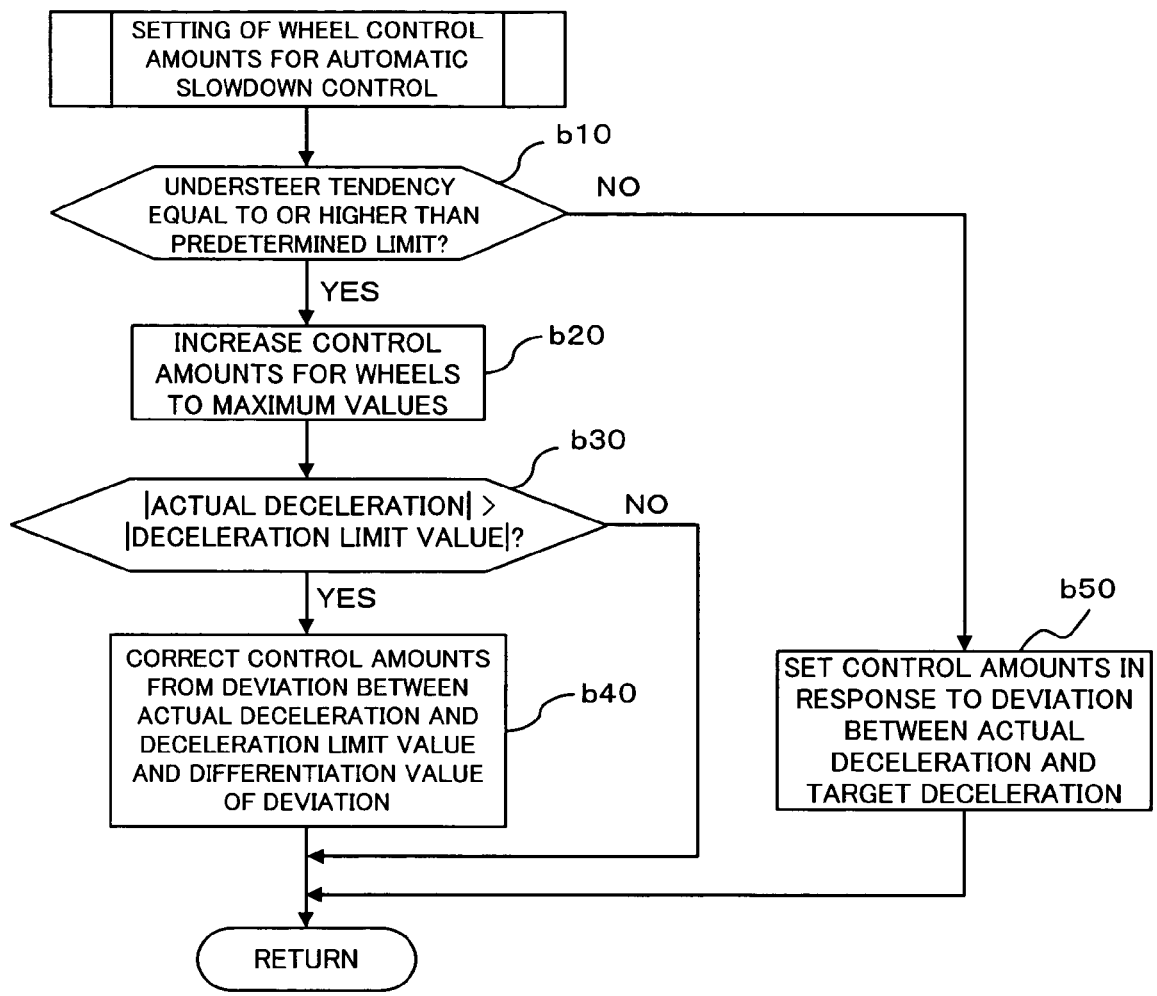
Figure 12:
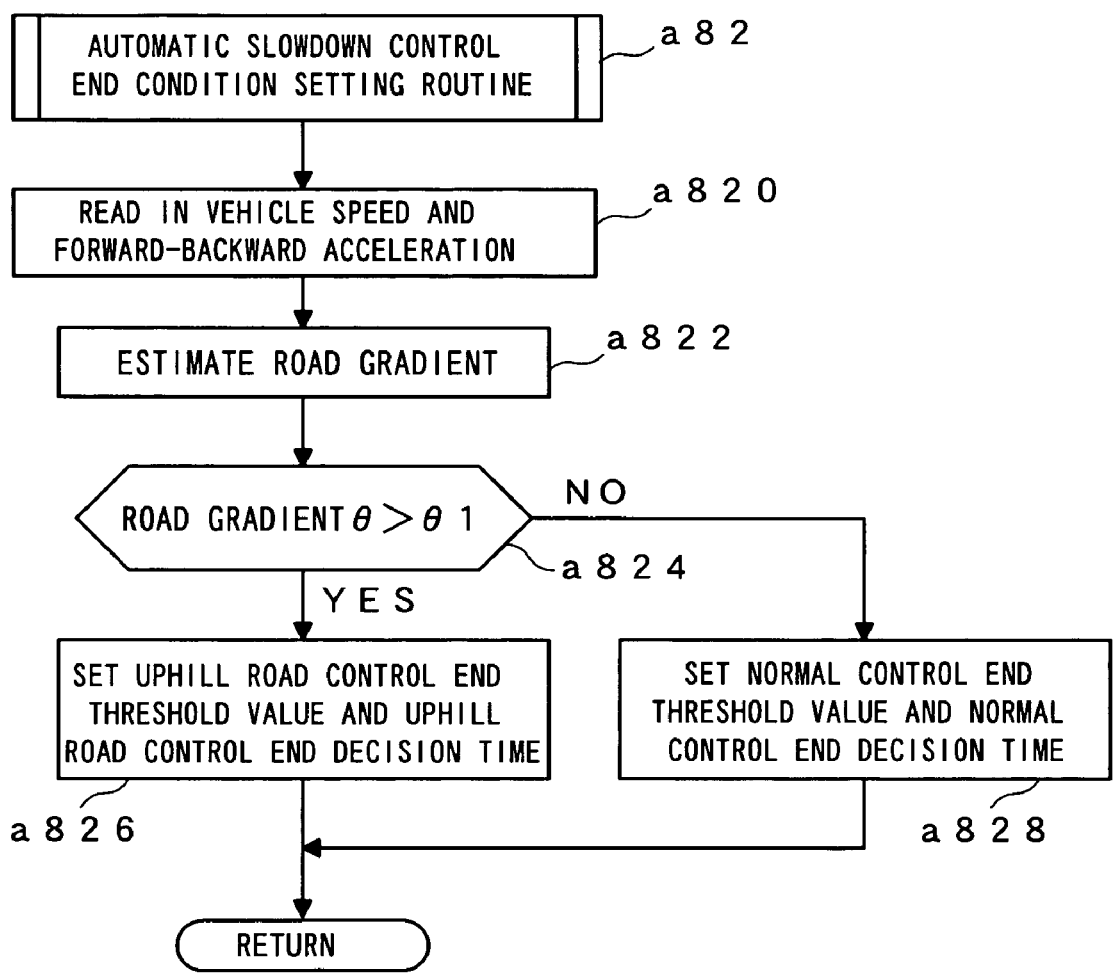

The automatic slowdown control apparatus for a vehicle according to the embodiment of the present invention is configured in such a manner as described above and carries out its control, for example, in accordance with the flow charts shown in FIGS. 10 to 12. It is to be noted that the procedure of the flow charts shown in FIGS. 10 to 12 is carried out in a control cycle (calculation cycle) set in advance.

Referring first to FIG. 10, it is decided from a flag F1 whether or not the yaw moment control is proceeding (step a10). The flag F1 has the value 1 when the yaw moment control is proceeding but has the value 0 when the yaw moment control is not proceeding. If the yaw moment control is not proceeding (F1=0), then the processing advances to step a20, at which it is decided whether or not the yaw moment control start condition described hereinabove is satisfied. If the yaw moment control start condition is satisfied, then the flag F1 is set to 1 (step a30) and then a braking control amount (increasing/decreasing pressure gradient) for each wheel for the yaw moment control is set (step a40). In particular, if the oversteer tendency is high, then the braking control amount (increasing/decreasing pressure gradient) is set in response to the yaw rate deviation to an object wheel so that the front wheel from between the turning outer wheels may be braked. However, if the understeer tendency is high, then the braking control amount (increasing/decreasing pressure gradient) is set in response to the yaw rate deviation to an object wheel so that the rear wheel from between the turning inner wheels may be braked.

Then, it is decided from a flag F2 whether or not the automatic slowdown control is proceeding (step a50). The flag F2 has the value 1 when the automatic slowdown control is proceeding but has the value 0 when the automatic slowdown control is not proceeding. If the automatic slowdown control is not proceeding (flag F2=0), then the processing advances to step a60, at which it is decided whether or not the automatic slowdown control start condition described hereinabove is satisfied. If the automatic slowdown control start condition is satisfied, then the flag F2 is set to 1 (step a70) and a braking control amount (increasing/decreasing pressure gradient) for each wheel for the automatic slowdown control is set (step a80).

On the other hand, if the automatic slowdown control is proceeding (flag F2=1) at step a50, then the processing advances from step a50 to step a82, at which an end condition for the automatic slowdown control is set. Thereafter, the processing advances to step a90, at which it is decided whether or not the automatic slowdown control end condition is satisfied. If the automatic slow down control end condition is satisfied, then the flag F2 is set to 0 (step a100).

It is to be noted that the setting of the end condition for the automatic slowdown control is performed in such a manner as illustrated in FIG. 12. Referring to FIG. 12, detection values of the vehicle speed V (or wheel speed) and the forward-backward acceleration $gx_{body}$ of the vehicle are read in first (step a820). Then, a road gradient θ is estimated by the road gradient estimation section 36f based on the actual forward-backward acceleration $gx_{body}$ and the theoretical forward-backward acceleration dV/dt determined by time differentiating the vehicle speed (wheel speed) from the wheel speed sensor 15 and multiplying a resulting value by a vehicle speed conversion rate (step a822). Then, the value of the road gradient θ calculated (estimated) in this manner is compared with a predetermined value θ1 set in advance by the end condition setting section 36g (step a824). If the road gradient θ exhibits an ascending gradient higher than the predetermined value θ1, then an uphill road control end threshold value $gx_{trce}1$ and uphill road control end decision time t1 are set by the end condition setting section 36g (step a826), but if the road gradient θ exhibits a gradient state lower than the predetermined value θ1 (that is, the road is a road of a little ascending gradient, a flat road or a road of a descending gradient), then a normal control end threshold value $gx_{trce}2$ and normal control end decision time t2 are set by the end condition setting section 36g (step a828). Referring back to FIG. 10, at step a90, the decision described hereinabove is executed based on the automatic slowdown control end condition selectively determined in this manner.

After the braking control amounts (increasing/decreasing gradients) for the wheels are set suitably in this manner (steps a40 and a80), the braking control amounts for each wheel are integrated (step a10). In particular, if the braking control amounts for each wheel for the automatic slowdown control are set at step a80, then the braking control amount for each wheel for the automatic slowdown control is added to the braking control amount for the wheel for the yaw moment control to set a final braking control amount (increasing/decreasing pressure gradient) for the wheel.

On the other hand, if the yaw moment control is proceeding (flag F1=1) at step a10, then the processing advances to step a130, at which it is decided whether or not the yaw moment control end condition described hereinabove is satisfied. If the yaw moment control end condition is not satisfied, then the processing advances to step a40 described hereinabove, but if the yaw moment control end condition is satisfied, then the flag F1 is set to 0 at step a140 and then it is discriminated at step a150 whether or not the flag F2 is F2=1. If F2=1, then the flag F2 is reset to 0.

The braking control amount for each wheel for the automatic slowdown control is set in such a manner as illustrated in FIG. 11. Referring to FIG. 11, it is first decided whether or not the understeer tendency is equal to or higher than the predetermined limit as described hereinabove (step b10). If the understeer tendency is not equal to or higher than the predetermined limit, then the braking control amount for each wheel is set in response to the deceleration deviation $gx_{err}$ between the actual deceleration $gx_{body}$ and the target deceleration $gx_{tgt}$ (step b50).

On the other hand, if the understeer tendency is equal to or higher than the predetermined limit at step b10, then the sudden slowdown mode is adopted. In the sudden slowdown mode, basically the braking control amounts for the wheels are set to a maximum increasing value so that the brake fluid pressure for the four wheels may be increased fully (step b20). Then, it is decided whether or not the magnitude of the actual deceleration $gx_{body}$ exceeds the magnitude of the deceleration limit value $gx_{limit}$ (step b30). If the magnitude of the actual acceleration $gx_{body}$ exceeds the magnitude of the deceleration limit value $gx_{limit}$, then the control amounts (four wheel full pressure increasing control amounts) set at step b20 are corrected by subtraction based on the deviation $\Delta gx$ between the actual deceleration $gx_{body}$ and the deceleration limit value gxlimit and a differentiated value of the deviation $\Delta gx$ so that the deceleration may not become excessive.

In this manner, with the present apparatus, by the automatic slowdown control, the vehicle can be prevented with certainty from traveling along a traveling path displaced from a turning path along which the vehicle should originally travel. Besides, if the understeer tendency becomes excessive during the automatic slowdown control, then the vehicle is slowed down rapidly (sudden slowdown mode), and consequently, the understeer tendency can be suppressed and the behavior of the vehicle can be stabilized with certainty.

Further, in the sudden slowdown mode, if the deceleration becomes excessive (if the magnitude of the actual deceleration $gx_{body}$ becomes equal to or greater than the magnitude of the deceleration limit value $gx_{limit}$), then this gives rise to the possibility that the behavior of the vehicle may be rendered unstable. However, in such an instance, since the control amounts (four wheel full pressure increasing control amounts) are corrected by subtraction based on the deviation between the actual deceleration and the deceleration limit value and the differentiated value of the deviation, such excessive slowdown as described above is prevented and dislocation of the front wheel lateral force can be prevented. Further, decrease of the rear wheel lateral force by dislocation of the road to the rear wheels can be prevented and the behavior of the vehicle can be stabilized with certainty.

Particularly in the automatic slowdown control, since the control end threshold value is set such that, where the road gradient is an ascending gradient, an end of the automatic slowdown control is decided rapidly without waiting that the stability of the vehicle comes sufficiently to the stable side, the automatic slowdown control is ended comparatively rapidly. Accordingly, the automatic slowdown is prevented from being performed excessively on the ascending gradient, and also when it is tried to accelerate the vehicle after the end of the automatic slowdown control, the vehicle can be accelerated comparatively rapidly.

Naturally, on a flat road or a downhill road, the control end threshold value is set to a value on the stable side of the stability of the vehicle. Consequently, even if the vehicle is placed into an acceleration tendency again by the road gradient after the end of the automatic slowdown control, the possibility that the posture or the behavior of the vehicle may be rendered unstable is low.

While a preferred embodiment of the present invention has been described above, the present invention is not limited to the embodiment, but can be carried out in various modified forms without departing from the spirit and scope of the present invention.

For example, in the embodiment described above, the correction by subtraction of the control amounts (four-wheel full pressure increasing control amounts) is performed based on the deviation between the actual deceleration and the slowdown limit value and the differentiated value of the deviation, and the correction accuracy is raised by addition of proportional control and differential control. However, as the simplest method, the correction by subtraction may involve only the proportional control (that is, the correction by subtraction is carried out based only on the deviation between the actual deceleration and the deceleration limit value).

Further, while, in the embodiment described above, the automatic slowdown control is executed restrictively only when the yaw moment control is carried out, such automatic slowdown control may be executed independently of the yaw moment control.

In this instance, the start condition of the automatic slowdown control is that all of the condition (3-1) that the target deceleration $gx_{tgt}$ is lower than the control start threshold value $gx_{trcs}$, the condition (3-2) that the vehicle body speed $V_{body}$ is equal to or higher than the reference value $V_1$, and the condition (3-3) that the brake is not being operated by the user are satisfied. On the other hand, the end condition of the automatic slowdown control is that any one of the condition (4-1) that a state wherein the target deceleration $gx_{tgt}$ is equal to or higher than the control end threshold value $gx_{trce}$ (a state wherein the magnitude of the target deceleration $gx_{tgt}$ is equal to or smaller than the control end threshold value $gx_{trce}$) continues for a predetermined period of time or more, the condition (4-2) that the vehicle body speed $V_{body}$ is equal to or lower than the reference value $V_2$, and the condition (4-4) that the brake is operated by the driver is satisfied.

Further, in the present embodiment, the end condition is set by the end condition setting section 36g separately for two different cases including a case wherein the road gradient θ is an ascending gradient equal to or higher than the predetermined value θ1 and another case wherein the road gradient θ is lower than the predetermined value θ1, the control end threshold value $gx_{trce}$ and the control end decision time may be set separately for three different cases including a case wherein the road gradient θ is an ascending gradient equal to or greater than a predetermined value θ11 (θ11>0), another case wherein the road gradient θ is a descending gradient smaller than another predetermined value θ12 (θ12<0) and a further case wherein the road gradient θ falls between the predetermined value θ11 and the predetermined value θ12 and exhibits a flat road. Or, they may be set separately for further finer ranges of the road gradient. In any case, it is significant to set the control end threshold value $gx_{trce}$ such that it decreases as the ascending gradient increases (as the magnitude of the deceleration increases) but increases as the descending gradient increases (as the magnitude of the deceleration increases) and set the control end decision time such that it decreases (to shorter time) as the ascending gradient increases but increases (to longer time) as the descending gradient increases.

Or, only one of the control end threshold value $gx_{trce}$ and the control end decision time may be set in response to the road gradient θ. Also in this instance, the control end threshold value $gx_{trce}$ is set such that it decreases as the ascending gradient increases, and the control end decision time is set such that it decreases as the ascending gradient increase.

Further, while, in the present embodiment, the road gradient is estimated from the actual forward-backward acceleration $gx_{body}$ and the time differentiated value of the vehicle speed or the wheel speed, it may otherwise be measured actually using an inclination sensor.

Further, since a motion of the vehicle has an influence on any of an estimated value obtained by estimation and an actually measured value obtained by actual measurement, the estimated value or the actually measured value may be further processed by a low-pass filter to obtain a stabilized value to be used actually. In this instance, it is necessary to select the characteristic of the low-pass filter so that the estimated value or the actually measured value may not become excessive in order to carry out the control appropriately.

The automatic slowdown control apparatus for a vehicle of the present invention can stabilize the behavior of an automobile upon turning traveling and contributes to further enhancement of the safety of the automobile and reduction of the burden in operation to the driver, and can be applied to various automobiles.

What is claimed is:

1. An automatic slowdown control apparatus for a vehicle, comprising:
    a braking mechanism for braking wheels of said vehicle;
    vehicle stability parameter value detection means for detecting a parameter value of a parameter or one of parameters corresponding to a stability of the posture and/or behavior of said vehicle upon turning;
    automatic slowdown control means for starting automatic slowdown control of rendering said braking mechanism operative to slow down said vehicle based on the parameter value detected by said vehicle stability parameter value detection means when the parameter value is displaced to the instability side of the vehicle stability with respect to a control start threshold value set in advance and ending the automatic slowdown control when the parameter value, while the automatic slowdown control is being carried out, is displaced to the stability side of the vehicle stability with respect to a control end threshold value set in advance as a value on the stability side of the vehicle stability; and
    road gradient estimation means for estimating or detecting a road gradient of a road on which said vehicle travels;
    the control end threshold value having a plurality of different values set therefor which correspond to different values of the road gradient such that the vehicle stability is displaced more to the instability side as the value of the road gradient becomes higher;
    said automatic slowdown control means selecting one of the values of the control end threshold value in response to the value of the road gradient estimated or detected by said road gradient estimation means and deciding the end of the automatic slowdown control based on the selected value of the control end threshold value.

2. The automatic slowdown control apparatus as claimed in claim 1, wherein, as the control end threshold value, an uphill road control end threshold value to be used for an uphill road whose road gradient is equal to or higher than a predetermined value and a downhill road control end threshold value to be used for a downhill road whose road gradient is lower than the predetermined value are set, and the uphill road control end threshold value has a value on the unstable side of the vehicle stability with respect to the downhill road control end threshold value.

3. The automatic slowdown control apparatus as claimed in claim 2, wherein the parameters include a lateral acceleration of said vehicle, and said vehicle stability parameter value detection means includes lateral acceleration detection means for detecting the lateral acceleration of said vehicle.

4. The automatic slowdown control apparatus as claimed in claim 3, further comprising vehicle speed detection means for detecting an actual speed of said vehicle, and wherein said automatic slowdown control means includes safe traveling speed arithmetic operation means for calculating a safe traveling speed of said vehicle based on the parameters including the lateral acceleration of said vehicle in response to a turning state of said vehicle, target deceleration setting means for calculating, when the actual speed detected by said vehicle speed detection means is higher than the safe traveling speed calculated by said safe traveling speed arithmetic operation means, a target deceleration of said vehicle based on a deviation between the safe traveling speed and the actual speed, and end decision means for deciding the end of the automatic slowdown control when a state wherein the magnitude of the target deceleration calculated by said target deceleration setting means is equal to or lower than a control end threshold value set in response to the road gradient continues for a predetermined period of time set in advance or more.

5. The automatic slowdown control apparatus according to claim 1, further comprising:
    forward-backward acceleration detection means for detecting a forward-backward acceleration of said vehicle; and
    vehicle speed detection means for detecting the vehicle speed of said vehicle;
    said road gradient estimation means estimating the road gradient based on the forward-backward acceleration detection value of said vehicle detected by said forward-backward acceleration detection means and a theoretical forward-backward acceleration value of said vehicle based on the vehicle speed of said vehicle detected by said vehicle speed detection means.

6. The automatic slowdown control apparatus according to claim 4, further comprising:
    forward-backward acceleration detection means for detecting a forward-backward acceleration of said vehicle; and
    vehicle speed detection means for detecting the speed of said vehicle;
    said road gradient estimation means estimating the road gradient based on the forward-backward acceleration detection value of said vehicle detected by said forward-backward acceleration detection means and a theoretical forward-backward acceleration value of said vehicle based on the actual speed of said vehicle detected by said vehicle speed detection means.

7. An automatic slowdown control method for a vehicle which includes a braking mechanism for braking wheels of said vehicle, and vehicle stability parameter value detection means for detecting a parameter value of a parameter or one of parameters corresponding to a stability of the posture and/or behavior of said vehicle upon turning, comprising:
    a step of starting automatic slowdown control of rendering said braking mechanism operative to slow down said vehicle based on the parameter value detected by said vehicle stability parameter value detection means when the parameter value is displaced to the instability side of the vehicle stability with respect to a control start threshold value set in advance;
    a step of ending the automatic slowdown control when the parameter value, while performing the automatic slowdown control is being carried out, is displaced to the stability side of the vehicle stability with respect to a control end threshold value set in advance as a value on the stability side of the vehicle stability;

the control end threshold value having a plurality of different values set which correspond to different values of the road gradient such that the vehicle stability is displaced more to the instability side as the value of the road gradient becomes higher;

a step, executed while the automatic slowdown control is being carried out, of estimating or detecting a road gradient of a road on which said vehicle travels and selecting one of the values of the control end threshold value in response to the estimated or detected value of the road gradient such that the end of the automatic slowdown control is decided based on the selected value of the control end threshold value.

8. The automatic slowdown control method as claimed in claim 7, wherein, as the control end threshold value, an uphill road control end threshold value to be used for an uphill road whose road gradient is equal to or higher than a predetermined value and a downhill road control end threshold value to be used for a downhill road whose road gradient is lower than the predetermined value are set, and the uphill road control end threshold value has a value on the unstable side of the vehicle stability with respect to the downhill road control end threshold value.

9. The automatic slowdown control method as claimed in claim 8, wherein the parameters include a lateral acceleration of said vehicle.

10. The automatic slowdown control method as claimed in claim 9, further comprising the steps executed during the automatic slowdown control of:

calculating a safe traveling speed of said vehicle based on the parameters including the lateral acceleration of said vehicle in response to a turning state of said vehicle;

calculating, when the detected actual speed is higher than the calculated safe traveling speed, a target deceleration of said vehicle based on a deviation between the safe traveling speed and the actual speed; and deciding the end of the automatic slowdown control when a state wherein the magnitude of the calculated target deceleration is equal to or lower than a control end threshold value set in response to the road gradient continues for a predetermined period of time set in advance or more.

11. The automatic slowdown control method according to claim 10, further comprising the steps of:

detecting a forward-backward acceleration of said vehicle and the speed of said vehicle; and estimating the road gradient based on the detected forward-backward acceleration detection value of said vehicle and a theoretical forward-backward acceleration value of said vehicle based on the detected vehicle speed of said vehicle.

* * * * *